United States Patent

Stuck et al.

[15] 3,701,856

[45] Oct. 31, 1972

[54] DATA TERMINAL SYSTEM

[72] Inventors: Carl G. Stuck, Chatsworth; Arthur L. Wilkes, Woodland Hills, both of Calif.

[73] Assignee: American Data Systems, Inc., Canoga Park, Calif.

[22] Filed: Dec. 15, 1970

[21] Appl. No.: 98,229

[52] U.S. Cl. ....................178/26 A

[51] Int. Cl. ....................H04l 3/00

[58] Field of Search..178/26 A, 26 R, 17.5; 235/155; 340/172.5

[56] References Cited

UNITED STATES PATENTS

| | | | |
|---|---|---|---|
| 3,051,940 | 8/1962 | Fleckenstein | 178/26 A |
| 3,457,368 | 6/1969 | Houke | 178/17.5 |
| 3,291,910 | 12/1966 | Niklas et al. | 178/26 R |
| 3,422,221 | 1/1969 | Sourgens | 178/26 R |
| 3,213,195 | 10/1965 | Gryk | 178/26 R |

*Primary Examiner*—William C. Cooper
*Assistant Examiner*—Horst F. Brauner
*Attorney*—Fulwider, Patton, Rieber, Lee & Utecht

[57] ABSTRACT

An electronic apparatus and code conversion method for use in a data terminal system incorporating a modified type head electric typewriter as the data input-output device. A single timing sequence automatically controls all code converting operations of the terminal for both transmitting and receiving data. In a transmit cycle of the timing sequence, a keyboard code of the typewriter is converted to a selected one of a number of communications line codes which is then transmitted over the line. In a receive cycle of the timing sequence, the line code is then further converted into a suitable print code for operating the print or function mechanisms for the typewriter. When the terminal is receiving data, only the receive cycle of the complete timing sequence is effective. All conversions are made by means of a master register which is gated in parallel through code conversion logic gates, or a read-only memory, back into the register. The states of the master register flip-flops containing the print code determine which of a series of electromechanical actuators are activated to operate the print mechanism of the typewriter. Additionally, a method and apparatus is disclosed for generating a six bit line code from only three outputs of the read-only memory.

17 Claims, 11 Drawing Figures

INVENTORS
CARL G. STUCK
ARTHUR L. WILKES
BY Fulwider, Patton, Rieber Lee, and Utecht
ATTORNEYS INVENTORS
CARL G. STUCK
BY ARTHUR L. WILKES
Fulwider, Patton, Rieber, Lee, and Utecht
ATTORNEYS INVENTORS
CARL G. STUCK
ARTHUR L. WILKES
BY Zulvider, Patton, Rieber, Lee, and Utecht
ATTORNEYS INVENTORS
CARL G. STUCK
ARTHUR L. WILKES
BY Fulwider, Patton, Rieber, Lee and Utecht
ATTORNEYS INVENTORS
CARL G. STUCK
ARTHUR L. WILKES
BY Fulwider, Patton, Rieber Lee, and Utecht
ATTORNEYS INVENTORS
CARL G. STUCK
BY ARTHUR L. WILKES.
Fulwider, Patton, Rieber, Lee, and Utecht
ATTORNEYS

DATA TERMINAL SYSTEM

BACKGROUND OF THE INVENTION

The present invention relates generally to data terminal systems and, more particularly, to an electronic apparatus and code converting method for such a system whereby the terminal can efficiently, reliably and economically communicate with computers and other terminals in a plurality of different communications line codes.

Modern data communications and processing techniques, particularly time sharing computer systems, are becoming available to more and more individuals and organizations by means of a relatively low cost data terminal installed on the user's premises. In some cases, the volume of data to be handled is such that it can be most economically and conveniently transmitted between terminals, or between a terminal and a computer, over voice grade telephone lines. When such telephone lines are used, the data transmission rate is limited by the characteristics of the transmission line and is comparable with the rate at which data can be printed on a typewriter. Hence, for some applications, the data input-output device for the terminal is similar to a typewriter and, in some cases, standard electric typewriters have been modified to serve this purpose. A type head electric typewriter, incorporating a typing sphere controlled by a mechanical logic arrangement is particularly suitable for convenient and economical conversion to a data input-output device for such terminals. Most data terminals, particularly those which employ modified typewriter input-output devices, are designed for operation in only one type of communications system; for example, computer time sharing. Such terminals are ordinarily capable of operating in only one communications line code and, if the user wished to utilize a communications system using a different line code, a completely separate terminal for each type of communications system and line code have heretofore been considered separately.

Even when the most economical form of typewriter input-output device is used, a large part of the net cost of a data terminal remains in the relatively complex electronic apparatus in the terminal, particularly if that apparatus provides the capability of communicating with computers and other terminals in a variety of different communications line codes. Typically, when designed using conventional methods well-known in the art, the electronic apparatus includes a number of relatively independent subsystems which function substantially separately, depending on which communications line code is being used, and whether the terminal is transmitting or receiving data. Generally, the subsystems include many redundant electronic circuits, particularly those subsystems in which code conversions are made and in the control circuitry for timing the various operations in separately operable subsystems. It will be apparent that such redundant electronic circuitry substantially increases the cost of the terminal electronics.

The design of circuitry for making code conversions conventionally includes a plurality of character storage registers with the code conversions being made through logic networks between registers. As storage registers are relatively complex and expensive, compared to other available electronic components, any redundancies in the storage registers required for multiple code conversions also substantially increases the cost of the terminal electronics.

In addition, when the conventional terminal is transmitting data, the typewriter is usually operated concurrently with the electronic apparatus. The electrical transients generated by the operation of the typewriter can cause interference and noise in the electronic apparatus and introduce errors in the operation of the data terminal.

Thus, there has long been a need in the data communications field for a data terminal which can reliably and economically communicate with computers and other data terminals in a variety of different communications line codes. There has also been a need for a typewriter data terminal which would be substantially immune to electronic interference generated by operation of the typewriter itself. The data terminal system of the present invention satisfies all of these needs.

SUMMARY OF THE INVENTION

Basically, the present invention provides a data terminal system including a new and improved code converting electronic apparatus and method and, particularly, a terminal system incorporating a type head typewriter input-output device and adapted for use with a relatively low grade transmission line, such as a voice grade telephone line. The relatively slow typewriter operating speed and transmission rate of the telephone line, compared to the speed of modern electronic devices, is used to great advantage in the system of the present invention to substantially reduce the complexity and cost of the electronic apparatus by providing a single, automatic timing sequence to control both the transmitting and receiving code conversions within the terminal for a plurality of communications line codes.

Thus, when the terminal is to transmit and print a character, a transmit cycle first controls the conversion of a keyboard code of the typewriter to a desired communications line code which is then transmitted over the line. The apparatus is then automatically switched to a receive cycle which controls the further conversion of the line code to a suitable print code for operating the print mechanism of the typewriter. When the terminal is receiving data from the line, the entire transmit-receive timing sequence is still in operation, but only the code conversions in the receive cycle are effective. Since the entire timing sequence can be completed at relatively high speed, there is no apparant delay in the operation of the typewriter when transmitting or receiving data. However, in accordance with the present invention, all code conversions, and transmissions of the character on the line, are made before the print mechanism is activated, thereby reducing the possibility of errors due to noise and other electrical transients within the typewriter.

A data terminal incorporating the electronic apparatus of the present invention has great versatility and economy in that it is capable of transmitting and receiving in a number of different communications line codes without substantially increasing the complexity or redundancy of the electronic circuitry. To this end, a plurality of sync times are provided within the timing sequence and only certain sync times are effective for performing the code conversions for transmitting and receiving in a particular line code. The sync time combinations for particular line codes are quickly and easily enabled by means of a manually operable mode selector. Thus, the same timing sequence is used for all code conversions, and for all the line codes, in both the transmitting and receiving cycles thereby greatly reducing the complexity and cost of the data terminal electronics.

Furthermore, the electronic apparatus of the present invention utilizes only one master register for the sequential code conversions which are made by parallel gating of the register through various logic networks and immediately reinserting the outputs of the networks back into the register. The need for a plurality of registers for immediate storage of coded words during code conversions is thereby eliminated, further reducing the complexity of the electronic apparatus of the data terminal. In a presently preferred embodiment of the present invention, the more complicated code conversions are advantageously made through a read-only memory device which is in the form of a readily available integrated circuit to further reduce the cost of the data terminal.

In the preferred embodiment of the electronic apparatus, one of the code conversions is made by the novel method of gating the master register through the read-only memory twice and utilizing the signal propogation delay through the read-only memory to insert the first output of the memory into a part of the master register before the output of the memory can change. The second output of the memory is then inserted into another part of the master register to complete the code conversion. The size and output requirements of the read-only memory is thereby reduced for added economy.

Thus, a data terminal incorporating the electronic apparatus of the present invention is considerably less expensive to construct then previously available systems. A single timing sequence is utilized for all code converting operations of the apparatus in both the transmit and receive cycles. This is used to advantage in the transmitting and printing of characters by first converting a keyboard code to a line code in the transmit cycle, and then further converting the line code in the receive cycle to a suitable print code. The print code is used to operate the print mechanism of the typewriter only as the last step to reduce noise and other transients. Additionally, only one master register, with parallel gating rhrough logic networks back into the register, is used for the code conversions to decrease the complexity of the apparatus. A novel double gating method for one code conversion also decreases the size and cost of the read-only memory used in the particular apparatus disclosed.

The above and other objects and advantages of the present invention will become more readily apparent from the ensuing, more detailed description when taken in conjunction with the following drawings.

DESCRIPTION OF THE PREFERRED EMBODIMENT

The data terminal system of the present invention is intended for use principally with a voice grade telephone line as the transmission medium between the terminal and other terminals or a computer. The system economically incorporates a modified type head typewriter as a data input-output device. While the structural details of the typewriter itself form no part of the present invention, its operation and modification will be briefly described to establish the characteristics of the input-output device of the terminal. A more complete description of the operation of such a type head typewriter can be found in U.S. Pat. No. 2,919,002 issued on Dec. 29, 1969 to L.E. Lester.

Basically, the typewriter has a spherical type head containing all of the characters which can be printed. The type head is rotated and tilted in response to six mechanical actuators, known as "latches," which are operated in a predetermined code to position a particular character for printing. The latches are selectively operated by a series of six parallel rods, known as character selector "bails," which are movable in a predetermined character code by the character keys of the typewriter.

Such a typewriter is modified for use as an input-output device for the data terminal system of the present invention by first removing a mechanical link between the character selector bails and the character latches. A series of six switches is then installed in the typewriter which are actuated by movement of the selector bails in the character code of the typewriter. A series of six solenoids which operate the character latches of the print mechanism in the desired mechanical print code is also installed in the typewriter. The character code generated by the character selector bails may then be processed in an electronic apparatus before the solenoids are activated.

Additionally, the function actuators, also known as "latches," of the typewriter are made automatically operable by connecting a series of four function solenoids mechanically in parallel with the existing actuators of the machine.

Figure 1:
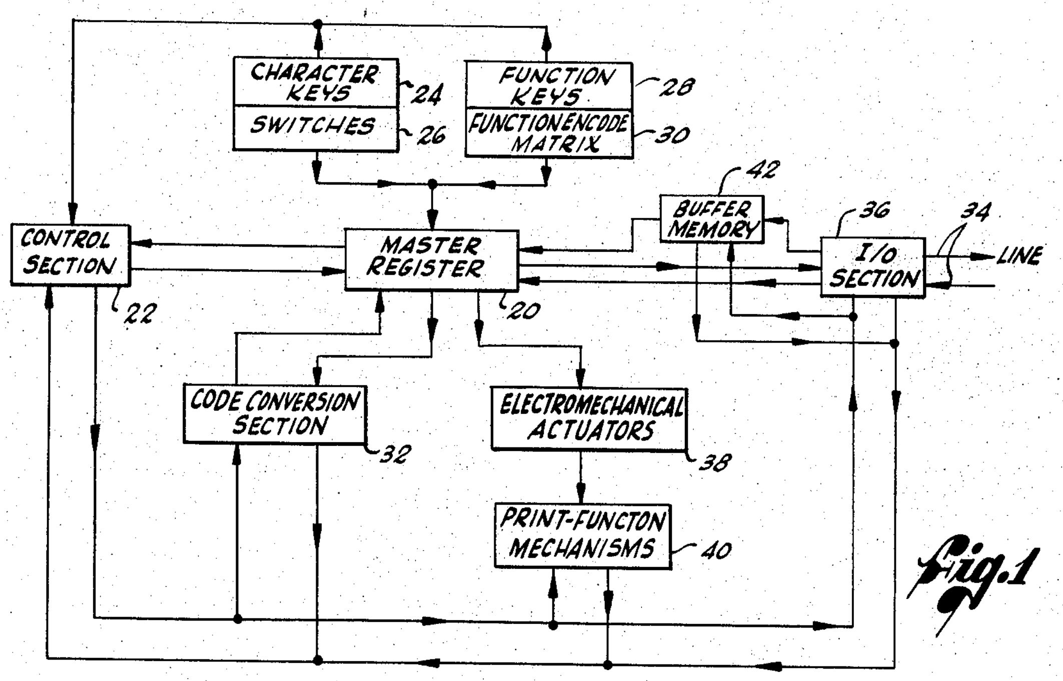
FIG. 1 is an overall block diagram of the data terminal system of the present invention.

Turning now to the drawings, FIG. 1 is a block diagram of a presently preferred embodiment of the data terminal system of the present invention showing the interconnection of the main sections thereof. As described above, the system includes a single master register 20 which serves as the only data storage means, other than conventional input buffering, for the data processing operations carried out within the terminal. The system also includes a control section 22 which generates the timing sequence for controlling the sequential operations within the terminal.

When data is to be transmitted, the transmit cycle of the timing sequence is effective and the master register 20 receives electrical signals derived either from a set of character keys 24 or from a set of function keys 28. The character keys 24 cause the actuation of a series of switches 26 in a predetermined character code, as discussed above. It should be noted that, while the typewriter performs a particular function when a function key 28 is depressed, no mechanical bail code is generated as in the case of the character keys 24. Therefore, a function encode matrix 30 is provided to produce a "function code" which is compatible with the character code. The combination of the character and function codes is designated herein as the "-keyboard code."

The function encode matrix 30 utilized in the presently preferred embodiment of the electronic apparatus of the present invention is of the diode matrix type well-known in the art and has single switches (not shown) operated by the function keys 28 connected to its inputs with its outputs connected to the master register 20.

The keyboard code in the master register 20 is converted to the desired line code by means of a code conversion section 32 and reinserted into the master register 20. The line code is then serially read out of the master register 20 onto a telephone line 34 through an input-output section 36 (abbreviated I/O SECTION in the drawings) which matches the telephone line to the terminal.

As the data is serially read out onto the line 34, it is recirculated back into the master register 20 by connecting the output of the register to its opposite input end. The receive cycle of the timing sequence is then made effective and, if a character is being transmitted, the line code in the master register 20 is then further converted by the code conversion section 32 to a suitable print code. The states of a plurality of flip-flops in the master register 20 then determine which of a set of electromechanical actuators 38 are activated to actuate print-function mechanisms 40 within the typewriter.

When a coded word is coming in from the line 34, it is received by the input-output section 36 at relatively slow speed and is then transferred at relatively high speed into a recirculating buffer memory 42 and is held there until the typewriter has completed its preceding operation, in accordance with conventional buffering techniques well-known in the art. Then the coded word is serially read at relatively high speed into the master register 20. The transmit cycle of the timing sequence is made ineffective and, when the timing sequence reaches the receive cycle, the proper code conversions are made in the code conversion section 32 and the appropriate electromechanical actuators 38 activate the print function mechanisms 40 to print a particular character or perform a particular function. It should be noted that the input-output section 36 and the buffer memory 42 of the system shown in FIG. 1 are of well-known design and, therefore, the details thereof form no part of the present invention.

Thus, the operation of the data terminal system to transmit data includes both the transmit cycle and the receive cycle to make the code conversions from the keyboard code to the desired line code, transmit the coded word, make a further conversion of the line code to an appropriate print code, and print a character. When the system is receiving data from the line 34, however, the system is conditioned so that only the receive cycle of the complete timing sequence is effective.

It should be appreciated that the use of a single master register 20 and parallel code conversions, with reentry into the master register, eliminates much of the transfer of data from one register to another ordinarily associated with data processing of this kind. Therefore, the electronic apparatus of the data terminal can be much more economically constructed to make the terminal available to many more users.

In a presently preferred embodiment, the typewriter data terminal system is capable of transmitting and receiving in three different communications line codes. The three codes selected for purposes of illustration are widely used in data terminals communicating over voice grade telephone lines with input-output devices similar to typewriters. In particular, the Correspondence code is provided, this code being the line code associated with the particular character code of the typewriter modified for use in the data terminal system of the present invention. This Correspondence code is particularly useful for communicating with other types of data terminals incorporating substantially the same typewriter modified by its manufacturer for use as a data terminal.

The other two communications line codes selected are the American Code for Information Interchange (ASCII) and the Binary Coded Decimal (BCD) code which are both particularly useful for communicating with computers on a time-sharing basis, or for communicating with Teletype equipment or other terminals.

Figure 6:
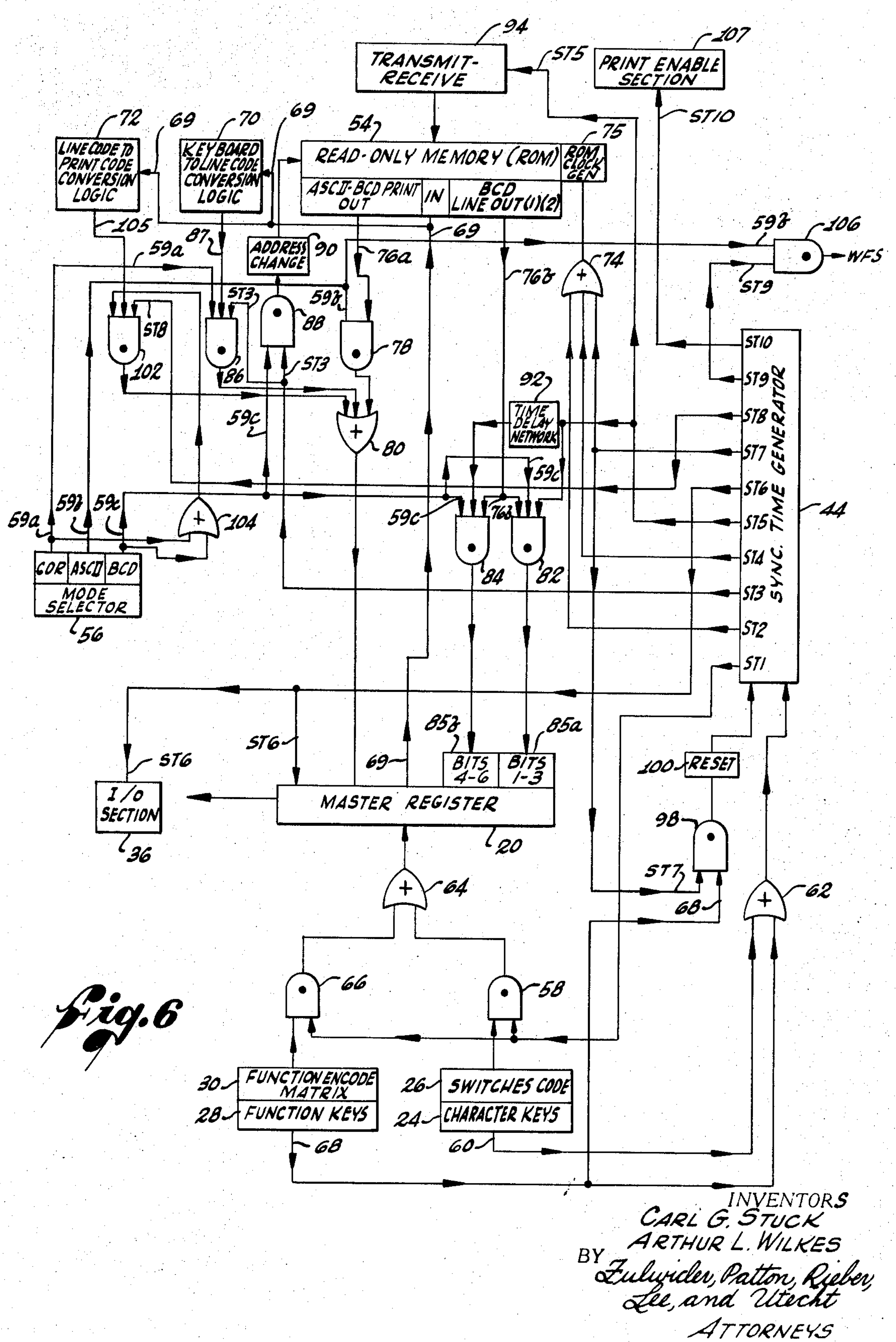
FIG. 6 is a combined block and logic function diagram of the logical interconnections between the master register and the associated code conversion logic gates and read only memory during the sequential code conversions for generating and transmitting a character or function code in the various modes provided.

Referring to FIG. 6, the data terminal system of the present invention operates with reference to an asynchronous sync time generator 44 which provides ten (10) separate sequential sync time signals, sync time 1, sync time 2, . . . , sync time 10 (abbreviated ST1, ST2, . . . , ST10 in the drawings), respectively, which activate various elements of the system to perform particular operations associated with particular sync times. In accordance with control techniques well-known in the data processing art, the sync time generator 44 may include a counter and associated logic gates to produce the appropriate sync time signals for the various operating conditions of the data terminal. Since the generator 44 is asynchronous, the counter is signalled to advance to the next sync time through suitable and conventional feedback logic gates only as each operation associated with each previous sync time is completed.

Figure 3:
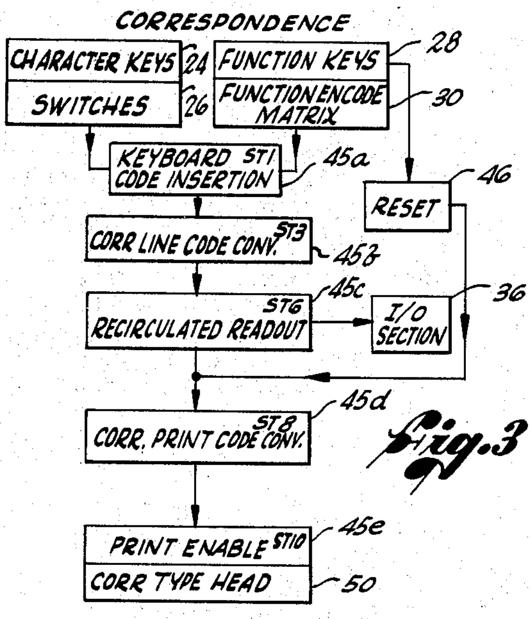
FIG. 3 is a block diagram of the sequential code conversion steps between the typewriter keyboard and type head for generating and transmitting a character or function code in the Correspondence mode and thereafter printing the character.
Figure 4:
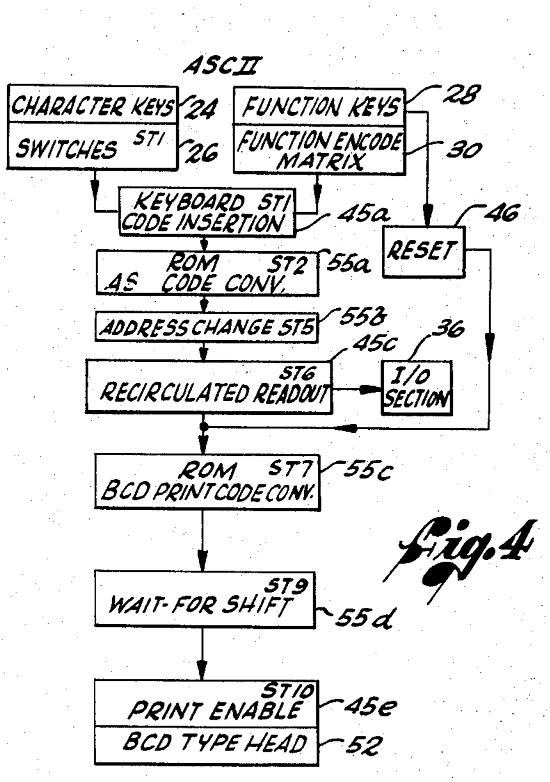
FIG. 4 is a block diagram of the sequential code conversion steps between the typewriter keyboard and type head for generating and transmitting a character or function code in the American Standard Code for Information Interchange (ASCII) mode and thereafter printing the character.
Figure 5:
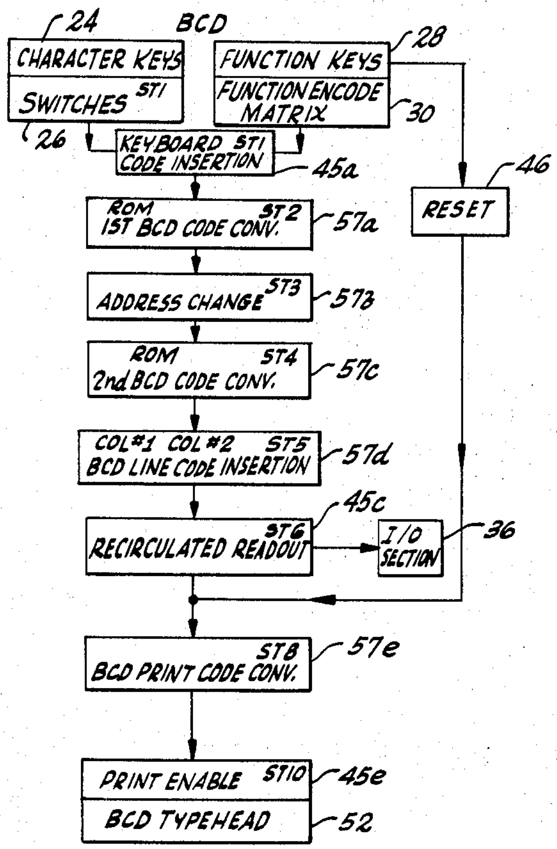
FIG. 5 is a block diagram of the sequential code conversion steps between the typewriter keyboard and type head for generating and transmitting a character or function code in the Binary Coded Decimal (BCD) mode and thereafter printing the character.

FIGS. 3, 4 and 5 of the drawings illustrate the sequential operation of the system for the three selected line codes. The sequential steps between functional devices such as the character and function keys 24, 28, respectively, are referenced to the particular sync times at which they occur by the labels ST1, ST2, 111, ST10. It should be noted that some of the steps are common to all three of the line codes and that different steps for different line codes may be performed at the same sync time, while other sync times control a step performed only for a particular line code.

Referring now to FIGS. 1, 3 and 6, the time sequence for the Correspondence line code begins by pressing any of the character or function keys, 24, 28, respectively, which starts the sync time generator 44. At sync time 1 (ST1), the keyboard code generated by the switches 26 or the function encode matrix 30 is inserted into the master register 20 in a keyboard code insertion step 45*a* initiated by the sync time 1 signal.

Following the completion of the keyboard code insertion step 45*a*, the sync time generator 44 is signaled by suitable conventional logic gates, discussed above, to advance to sync time 2 but, as there is no operation at sync time 2 associated with the Correspondence sequence, the sync time generator is again signalled to advance to sync time 3. At sync time 3, the master register 20 is gated in parallel through associated logic gates (to be described hereinafter) in the code conversion section 32 to perform a Correspondence line code conversion step 45*b* and the generated line code is reinserted into the master register. The sync time generator 44 is then signaled to advance through sync times 4 and 5, which call for no operations in the Correspondence mode, to sync time 6 in which the coded word in the master register 20 is serially read out onto the line through the input-output section 36 of the system and recirculated back into the master register in a readout step 45*c*.

Following the readout step 45*c*, if a character key 24 is pressed, the sync time generator 44 is signaled to advance to the next sync time. However, if a function key 28 is pressed, the operation of the key itself starts the performance of the function by the typewriter so no further operation is required of the electronic apparatus after the line code is read into the input-output section 36. Therefore, a reset section 46 stops the sync time generator 44 and resets it to await the pressing of another of the character or function keys 24, 28. It should be noted that the code conversions and transmission of the line code are performed at relatively high speed, usually before the relatively slow mechanical system of the typewriter can perform the function.

If a character key 24 is depressed, the sync time generator 44 is signalled to advance through sync time 7 to sync time 8 where, in a Correspondence print code conversion step 45*d*, the master register 20 is again gated in parallel through the code conversion section 32 and a suitable print code is reinserted into the master register. The sync time generator 44 is then signaled to advance through sync time 9 to sync time 10 in which a Correspondence type head 50 is actuated in a print enable step 45*e* to print a particular character.

In the Correspondence mode, it has been found desirable from an economic standpoint to utilize the Correspondence type head 50 (FIG. 3) with the characters positioned in accordance with a Correspondence code while, for the ASCII and BCD modes, a BCD type head 52 (FIGS. 4 and 5) with the characters positioned in accordance with a BCD print code is used. Thus, when switching from the Correspondence to the ASCII or BCD modes or vice versa a simple and conventional type head change is necessary.

Figures 9, 10:
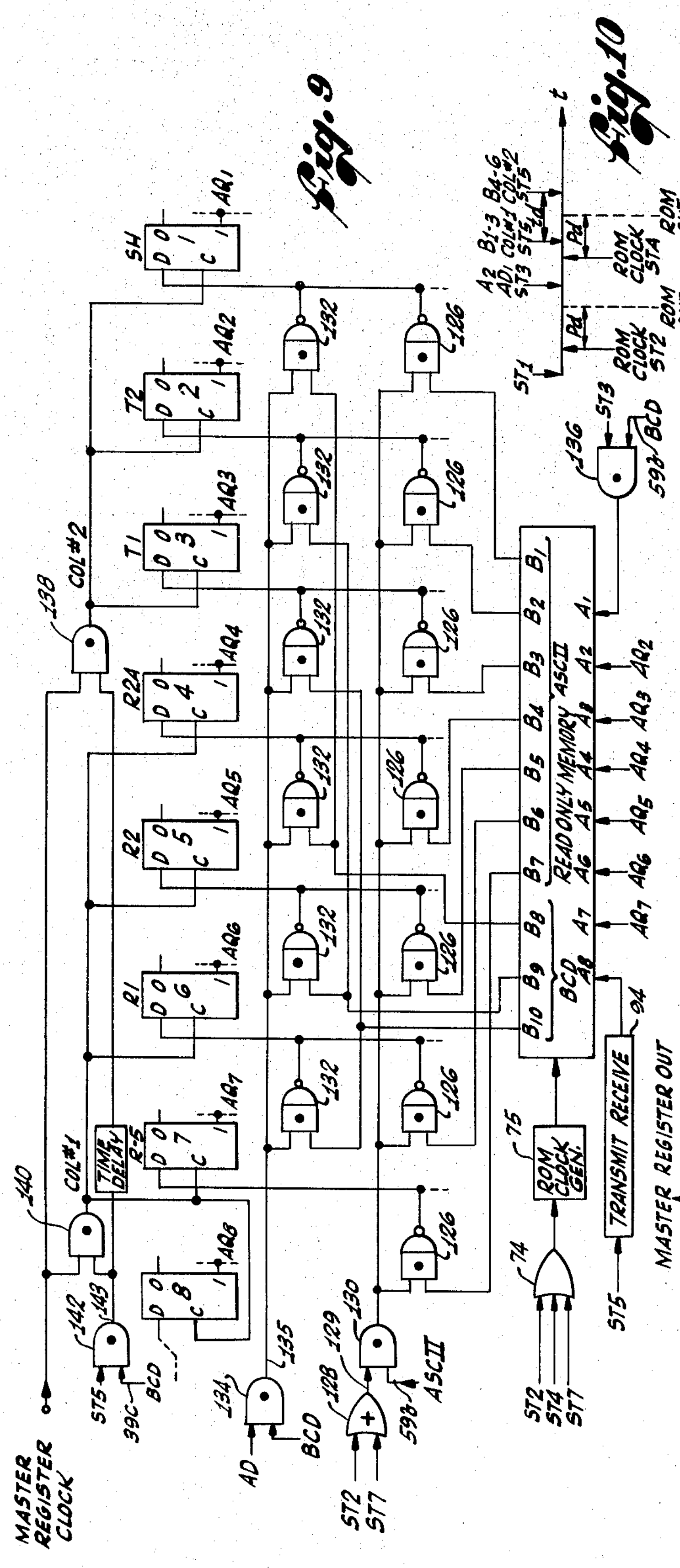
FIG. 9 is a combined block and logic function diagram of the master register and its associated logic gates for code conversions through the read-only memory.
FIG. 10 is a diagram of the time sequencing of the various steps required for converting the keyboard code to the Binary Coded Decimal (BCD) line code.

While the Correspondence code conversions are relatively simple, the ASCII and BCD conversions are relatively complex. The ASCII and BCD code conversions are therefore made through a read-only memory 54, (abbreviated ROM in the drawings), as shown in FIGS. 6 and 9. The read-only memory 54 utilized in the presently preferred embodiments of the invention is of well-known design and is normally constructed in an integrated circuit form which is complete except for the final interconnection of the logic elements. The user of the read-only memory 54 conventionally supplies the manufacturer with the code specification for the input and output of the read-only memory and the manufacturer then completes the specified final interconnection of the logic elements and encapsulates the completed package. The particular read-only memory 54 utilized in the electronic apparatus of the present invention has eight input addresses and ten outputs.

As shown in FIGS. 4 and 6, again following the pressing of a character or function key 24, 28, respectively, in the keyboard code insertion step 45*a* common to all three line code modes, keyboard code is inserted into the master register 20 at sync time 1 and the sync time generator 44 is advanced. In an ASCII code conversion step 55*a* at sync time 2, the master register 20 is gated into the read only memory 54 and the ASCII line code is inserted back into the master register. Sync times 3 and 4 are not associated with an ASCII code conversion so that no further operation is performed until sync time 5 when, in an address change step **55*b*, the signal at one address position of the read-only memory 54 is changed to condition it for the next code conversion. In the readout step 45*c* at sync time 6, the ASCII line code in the master register 20 is serially read out into the input-output section 36 of the system and recirculated back into the master register 20** in the same manner as for the Correspondence mode discussed above.

Again, if a function key 28 is depressed, the system is reset. However, if a character key 24 is depressed, the recirculated word in the master register 20 is again gated through the read-only memory 54, in a BCD code conversion step **55*c* at sync time 7**, to convert from the ASCII code to the BCD print code.

In the ASCII code, there is a separate coded word for each character both in the lower and upper cases. However, in order to print an upper case character, the shift mechanism of the typewriter must be operated. Therefore, at sync time 9, a "wait-for-shift" step **55*d* is performed to determine if the typewriter is in the proper case to print the particular coded word. If it is not, the remainder of the cycle is stopped until the machine is shifted to the proper case at sync time 9. In the print enable step 45*e* at sync time 10, the BCD type head 52** is actuated to print the character, as discussed above.

In the Binary Coded Decimal (BCD) mode, the keyboard code must be converted to a 6 bit coded word. However, in the read-only memory 54 utilized with the present invention, only 10 outputs are available and seven of these are used for the ASCII code conversion. Thus, the 6 bit BCD code word must be generated from the remaining three outputs. In order to accomplish this, the keyboard code is gated through the read-only memory 54 twice, the output from the first gating determining the first 3 bit positions and the output from the second gating determining the next three bit positions of the BCD code.

The sequence for the BCD line code is shown in FIGS. 5 and 6, which is the same as discussed above through the keyboard code insertion step **45*a* at sync time 1. In a first BCD conversion step 57*a* at sync time 2, the keyboard code in the master register 20 is gated through the read-only memory 54 but the output of the read-only memory is not gated back into the master register at that time. In an address change step 57*b* at sync time 3, one control address position in the read-only memory 54 is changed and, in a second BCD conversion step 57*c* at sync time 4, the master register 20** is again gated through the read-only memory.

There is a propagation delay between the time an address is gated into the read-only memory 54 and the time the output corresponding to that address appears at its output terminals. This fact is used to advantage in the present invention in a BCD insertion step **57*d* at sync time 5 by providing sequential signals in which a first column signal (COL No. 1) gates the first output of the read-only memory 54 into the first three bit positions in the master register 20 before the output of the read-only memory can change in response to the second BCD conversion step 57*c*. After the elapse of the propagation delay time, the output of the read-only memory 54 has changed and the second column signal (COL No. 2) in the BCD insertion step 57*d* gates the second output of the memory into the second three bit positions in the master register 20. Thus, a 6 bit BCD code can be generated utilizing only the three remaining available outputs from the read-only memory 54**.

As before, in the readout step **45*c* at sync time 5, the BCD line code in the master register 20 is serially read out into the input-output section 36 of the system and recirculated back into the master register. Again, if a function key 28 is depressed, the system is reset and, if a character key 24 is depressed, the system continues operating. Thus, after advancing through sync time 7 which is not associated with the BCD mode, in a BCD print code conversion step 57*e* at sync time 8 the BCD line code is gated through logic gates to generate a BCD print code which is reinserted into the master register 20. In the print enable step 45*e* at sync time 10, the BCD type head 52** is actuated to print the character, as discussed above.

A representative logic function diagram for the transmission of a character or function and the printing of a character is shown in FIG. 6. It can be seen that a mode selector 56 generates either Correspondence, ASCII or BCD signals, **59*a*, 59*b* and 59*c***, respectively, which enable particular logic gates to permit the proper code conversion to be made for the particular selected mode.

If a character key 24 is pressed, the character code generated by the switches 26 is applied to one input of an AND gate 58 and a start signal 60 is generated and sent through an OR gate 62 to start the sync time generator 44. A sync time 1 signal ST1 is then applied to the second input of the AND gate 58 enabling the character code to be gated through an OR gate 64 into the master register 20.

If a function key 28 is depressed, the output of the function encode matrix 30 is applied to one input of an AND gate 66. A function signal 68 is substantially concurrently generated and fed through the OR gate 62 to start the sync time generator 44. The sync time 1 signal ST1 is applied to the AND gate 66 connected to the function encode matrix 30 enabling the function code to be gated through the OR gate 64 to the master register 20. Thus, at sync time 1, the character code or function code is entered into the master register 20 as the keyboard code.

A parallel output 69 of the master register 20 is continuously connected to the inputs or "address positions" of the read-only memory 54 and to code conversion logic gates 70, 72 (hereinafter fully described) but the outputs of the read-only memory and logic gates are fed back to the input of the master register through gates controlled by the sync time generator 44 and the mode selector 56. The read-only memory 54 is a clocked device so that its output is not affected until a clock pulse activates it. Therefore, at sync time 2, a sync time 2 signal ST2 is fed through an OR gate 74 to a read-only memory clock generator 75 which provides a suitable pulse to clock the memory.

The read-only memory 54 then contains an ASCII line code output **76*a* for the particular keyboard code word in the master register 20 and the first three bits of a BCD line code output 76*b*. The ASCII line code output 76*a* is fed to one input of an AND gate 78 and a second input to the gate is connected to the ASCII signal 59b from the mode selector 56. If the mode selector 56 is in the ASCII position, the AND gate 78 is enabled and the ASCII line code output 76a passes through the gate and through an OR gate 80 to the master register 20**.

In the BCD mode, the BCD line code output 76b of the read-only memory 54 is fed to an input of each of two parallel AND gates 82, 84 leaving their outputs connected to the one through three and four through 6 bit positions, 85a and 85b, respectively, in the master register 20. The gates 82, 84 are enabled by the BCD signal 59c from the mode selector 56 applied to second inputs to the gates. Third inputs to the parallel AND gates 82, 84 are not activated, however, so the BCD line code output 76b of the read-only memory 54 is not transferred to the master register 20 at sync time 2.

It will be appreciated that if the mode selector 56 is not in the ASCII or BCD mode, none of the aforementioned AND gates 78, 82, 84 are enabled so that no operation is performed at sync time 2. When the mode selector 56 is in the Correspondence mode, at sync time 3 an AND gate 86 is enabled by the Correspondence signal 59a and the sync time 3 signal ST3 to gate an output 87 of the keyboard to line code conversion logic gates 70 through the OR gate 80 to the master register 20. The Correspondence keyboard code is thereby converted to the Correspondence line code and reinserted in the master register 20.

Again, it will be understood that if the mode selector 56 is not in the Correspondence mode, the AND gate 86 will not be enabled and the keyboard code in the master register 20 will not be converted to the Correspondence line code. It should also be noted that, if the system is in the ASCII mode, no operation is performed at sync time 3. If the system is in the BCD mode, however, the BCD signal 56a and the sync time 3 signal ST3 enable an AND gate 88 to activate an address change section 90 to initiate a voltage level change in a first control address position in the read-only memory 54 so that the second half of the BCD line code can be generated.

In the read-only memory 54 incorporated in the preferred embodiment of the present invention, a level change in a particular first control address position specifies different sets of coded outputs 76a and 76b so that the particular coded word output depends on the level of that control address position. The address change section 90 is then any conventional circuitry which can change the first control address position to the appropriate level for the proper mode and sync time.

At sync time 4, a sync time 4 signal ST4 is fed through the OR gate 74 to the read-only memory clock generator 75 and the code conversion for the new first control address is initiated. However, because of the propagation delay through the read-only memory 54, the output 76b of the memory does not change immediately and, before the output of the memory can change, a sync time 5 signal ST5 is applied to the third input to the first parallel AND gate 82 transferring the first output of the read-only memory to the first three bit positions 85a in the master register 20. After the output 76b of the read-only memory 54 has changed in response to the new control address, the sync time 5 signal ST5, delayed by a time delay network 92, is applied to the third input to the second parallel AND gate 84 and the new output of the read-only memory is gated to the four through six bit positions 85b in the master register 20. The sync time 5 signal ST5 is also applied to a transmit-receive section 94 which changes the read-only memory 54 to the receive cycle for the second half of the complete timing sequence.

Again, the output of the transmit-receive section 94 is applied to a second control address of the read-only memory 54 which, depending on its level, specifies different sets of coded outputs 76a and 76b of the memory. The transmit-receive section 94 is then any conventional circuitry which can determine the proper half of the timing sequence.

It will be appreciated that, if the system is not in the BCD mode, the only operation performed at sync time 5 is to change the read-only memory 54 from the transmit to the receive cycle. At sync time 6, a sync time 6 signal ST6 activates the master register 20 and the input-output section 36 to serially read out the contents of the master register into the input-output section and recirculate the contents back into the master register. At sync time 7, if a function key 28 is actuated, the function signal 68 is applied to one input of an AND gate 98 and a sync time 7 signal ST7 is applied to the other input to activate a reset network 100 which stops the sync time generator 44 and resets it, as discussed above.

If a character key 24 is depressed, however, the sync time 7 signal ST7 is fed through the OR gate 74 to the read-only memory clock generator 75 to clock the read-only memory 54. In the receive cycle, the transmit-receive section 94 specifies that an ASCII code input to the read-only memory 54 from the master register 20 will result in the BCD print code appearing at the output 76a of the ASCII section of the memory which is gated through the AND gate 78 enabled by the ASCII signal 59b, and OR gate 80 back to the master register 20.

At sync time 8, an AND gate 102 enabled by a sync time signal ST8 and, either the Correspondence or BCD signal 59c or 59b, respectively, fed from the mode selector 56 through an OR gate 104, feeds an output 105 of the line to print code conversion logic gates 72 through the OR gate 80 to the master register 20. If the system is in the Correspondence mode, the Correspondence line code is converted to the Correspondence print code, but if the system is in the BCD mode, the BCD line code is converted to the BCD print code by the same code conversion logic gates 72.

At sync time 9, the ASCII signal 59b is applied to one input of an AND gate 106 and a sync time 9 signal ST9 is applied to the other input to the gate to generate a wait-for-shift signal (WFS in FIG. 6) so that the typewriter can be shifted to the proper case, if necessary. At sync time 10, a sync time 10 signal ST10 activates a print enable section 107 which controls the printing of the character. It will be noted that when the system is used to transmit data, the operation of a function key 28 automatically starts performance of that function within the typewriter so that no further operation is needed.

Figure 2:
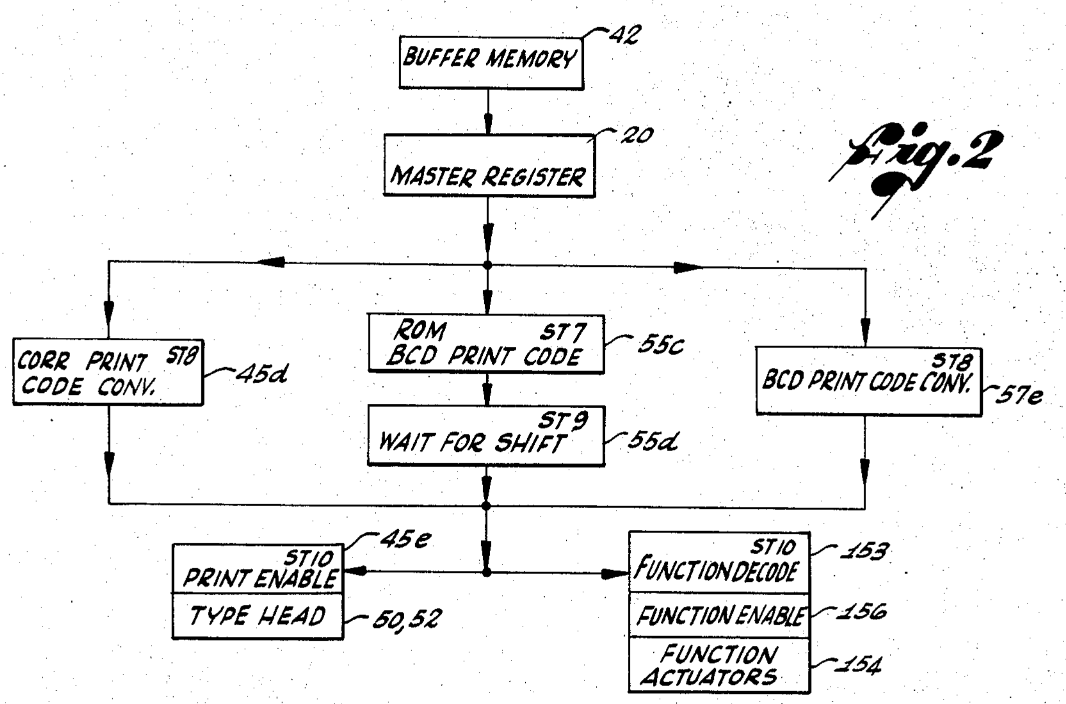
FIG. 2 is a more detailed block diagram of a portion of the data terminal system of the present invention in the various modes when data is taken from the buffer memory of the system.
Figure 7:
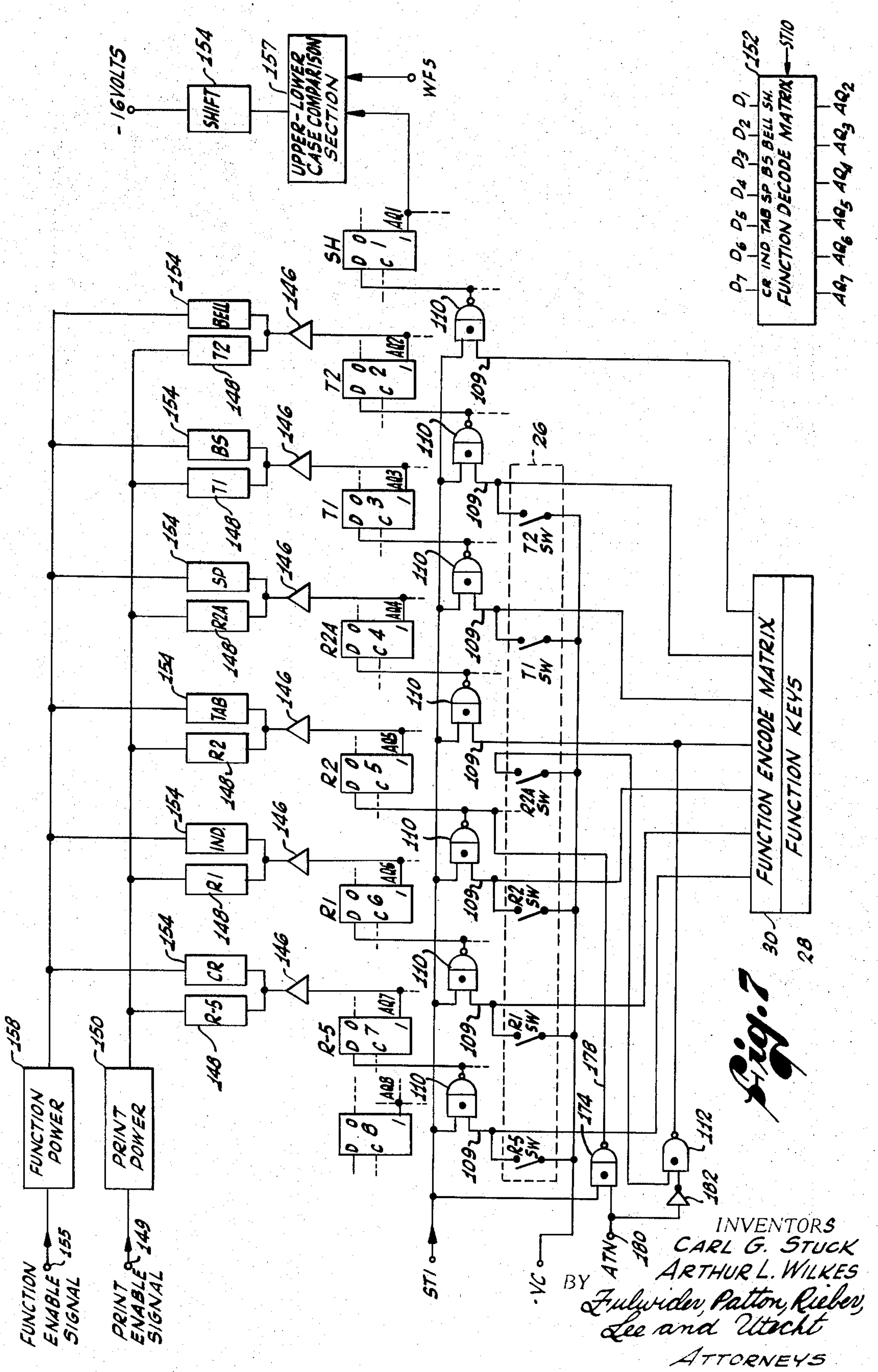
FIG. 7 is a combined block and logic function diagram of the master register of the data terminal system and its interconnections for receiving the keyboard code from the switches associated with the character selector bails and functions keys of the typewriter, together with the connections of the master register to the solenoids which operate the print or function mechanisms of the typewriter.

The use of the master register 20 of FIGS. 1, 2 and 6 as the initial input from the character keys 24 and switches 26, or function keys 28 and function encode matrix 30, is illustrated in more detail in FIG. 7. The master register 20 has eight D-type flip-flops 1 through 8 in which the state of the "1" output at a particular time follows the state of the "D" input when the flip-flop is clocked. The D-type flip-flop is, therefore, designated a "delay-memory" device.

A series of six selector bail switches 26 is shown, each being associated with a keyboard bail which normally produces a tilting or rotation of the type head as discussed above. Thus the switches are labeled "T1" for tilt one, "R1" for rotate one, and so forth. Each switch 26 has one terminal connected to a voltage source $-Vc$ and the other terminal connected to a first input 109 to a first series of NAND gates 110. The R2A switch additionally passes through an intermediate NAND gate 112 before being connected to its first NAND gate 110. Normally, the intermediate NAND gate 112 is biased continuously open so that the terminal of the R2A switch is effectively connected directly to the first input 109 of its first NAND gate 110. The bail switches 26 are opened and closed in accordance with the predetermined character selector bail code for particular characters.

When the sync time generator 44 (FIG. 6) is started, the sync time 1 signal ST1 is applied to a second input to each of the first series of NAND gates 110 to enable the gates and condition the "D" inputs of master register flip-flops 2 through 7 in accordance with the condition of the respective bail switches 26. The flip-flops are then conventionally clocked so that the outputs of the master register 20 then contain the character code.

If a function key 28 is pressed, the function encode matrix 30 is activated to generate a function code, as described above, and the outputs of the matrix are applied to each of the first inputs 109 to the first series of the NAND gates 110. Again, the sync time 1 signal ST1 enables the first series of NAND gates 110 and the flip-flops are clocked to enter the function code of the function encode matrix 30 into the master register 20.

Figure 8:
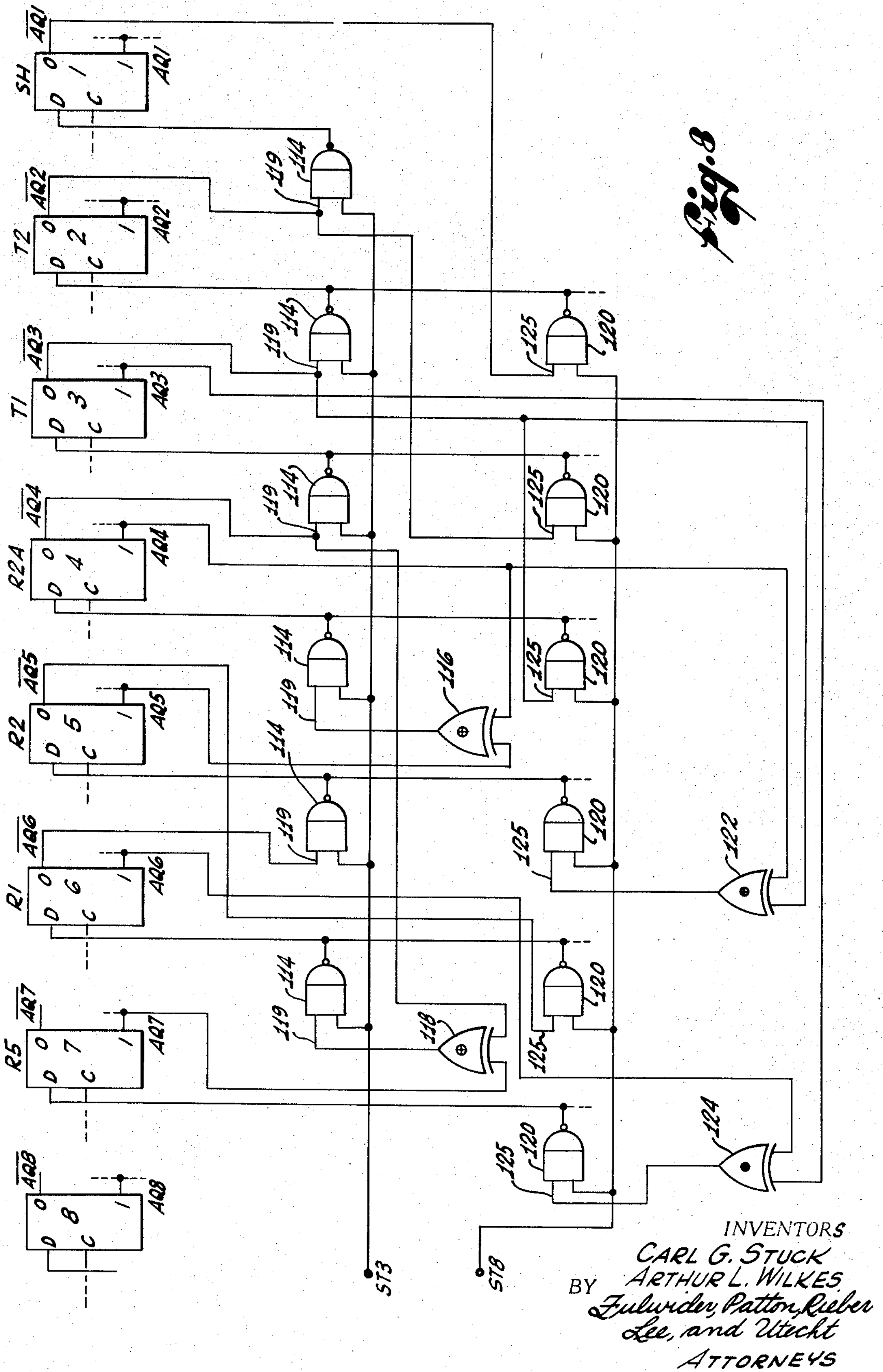
FIG. 8 is a logic function diagram of the master register and its interconnections through the associated code conversion logic gates for converting the keyboard code to the Correspondence line code and for converting the Correspondence line code or Binary Coded Decimal (BCD) line code of the print code.

The code conversions between the keyboard code and the Correspondence line code, implemented by the logic circuitry shown in FIG. 8, are relatively simple and are illustrated by the logic equations below in which the "B" prefixes represent a bit position in the master register 20 for the Correspondence line code and the "T" and "R" prefixes represent the outputs of the flip-flops conditioned by the tilt and rotate switches 26 and the function encode matrix 30 (FIG. 7). The symbol $\overline{\ }$ over a letter or numeral indicates the logical "not" and the symbol $\oplus$ indicates the logical EXCLUSIVE-OR function in which an output is generated by one or the other of two inputs but not by both.

$B1 = \overline{T2}$
$B2 = \overline{T1}$
$B3 = \overline{R2A}$
$B4 = R2A \oplus R2$
$B5 = \overline{R1}$
$B6 = \overline{R2A} \oplus R\text{–}5$ As shown in FIG. 8, these code conversions are made relatively simple by means of a second series of NAND gates 114 and two EXCLUSIVE-OR logic gates 116 and 118, respectively. A first input 119 to each of the second series of NAND gates 114 is connected either to the appropriate output $\overline{AQ1}$, $\overline{AQ2}$, . . . , $\overline{AQ8}$ of a master register flip-flop or to the output of one of the EXCLUSIVE-OR gates 116, 118. The output of each of the gates 114 is connected to the appropriate "D" input of the flip-flops. The second series of NAND gates 114 is enabled by a sync time 3 signal ST3 connected to the second input to each of the gates. When the gates 114 are enabled, the flip-flops are again conventionally clocked to change the state of the flip-flops to the Correspondence line code.

The code conversion for the Correspondence line code to the Correspondence print code for use with a Correspondence type head 50 (FIG. 3) is the same as the code conversion for the BCD line code to the BCD print code when a BCD type head 52 (FIGS 4 and 5) is used. Therefore, a single set of logic elements can be used for both code conversions. These code conversions are also relatively simple and are specified by the following logic equations in which the prefixes and symbols are the same as those above.

$T2 = \overline{B1}$
$T1 = \overline{B2}$
$R2A = \overline{B3}$
$R2 = \overline{B3} \oplus B4$
$R1 = \overline{B5}$
$R\text{–}5 = B3 \oplus B6$ As also shown in FIG. 8, these code conversions are made with a third series of NAND gates 120 and two EXCLUSIVE-OR gates 122, 124, respectively. Again, a first input 125 to each of the third series of NAND gates 120 is connected to an appropriate output AQ1, AQ2, . . . , AQ8 of a flip-flop or to the output of one of the EXCLUSIVE-OR gates 122, 124 and the NAND gates are enabled by the sync time 8 signal ST8 applied to the second input to each of the gates. Again, the flip flops are clocked to effect the code conversion.

It will be appreciated that the outputs of the first, second and third series of NAND gates 110, 114 and 120, respectively, are all connected to the D inputs of the master register 20 flip-flops, but that each series is enabled at different sync times (ST1, ST3 or ST8) so that, in effect, only one set of logic elements is connected to the D inputs of the flip-flops at any one time. To accomplish this, the configuration of the NAND gates 110, 114, 120 is such that the direct connection of their outputs serves as an "OR" logic function so that the state of one series of NAND gates is not affected by the state of any other series of NAND gates. Such a configuration for the NAND gates 110, 114, 120 is well-known in the art and is readily available commercially.

The logic arrangements for the code conversions through the read-only memory 54 in the ASCII or BCD codes is shown in FIG. 9. The "1" output of flip-flops 2 through 7, AQ2, AQ3, . . . , AQ7, respectively, of the master register 20 of FIGS. 1, 2 and 6 are permanently connected to address positions A2 through A7 of the read-only memory 54. As discussed above, the read-only memory 54 is a clocked device so that its outputs (76*a* or 76*b* of FIG. 6) are changeable only when the read-only memory clock generator 75 is activated by sync time signals ST2, ST4, and ST7 applied to the OR gate 74.

The ASCII outputs B1 through B7 of the read-only memory 54 is applied to the D inputs of flip-flops 1 through 7 of the master register 20 through a fourth series of NAND gates 126 with their outputs connected to the D inputs of the flip-flops in parallel with the first, second and third series of NAND gates 110, 114, 120, as described above. The fourth series of NAND gates 126 is enabled by sync time signals ST2 and ST7 applied to an OR gate 128 with its output connected to a first input 129 to an AND gate 130. A second input to the AND gate 130 is connected to the ASCII signal **59*b* from the mode selector 56 (FIG. 6) so that the fourth series of NAND gates 126** is operative only when in the ASCII mode.

Assuming that the keyboard code has been gated into the master register 20 at sync time 1 as described above, the keyboard code then appears at address positions A2 through A7 of the read-only memory 54. The transmit receive section 94 is in the transmit cycle and applies a suitable control signal to the second control address position A8. At sync time 2, the fourth series of NAND gates 126 is enabled and the read-only memory 54 is clocked. The keyboard code is then converted by the read-only memory 54 into the ASCII line code which appears at outputs B1 through B7 of the read-only memory and are gated through the fourth series of NAND gates 126 to the D inputs of flip flops 2 through 7 of the master register 20.

As there is a propagation delay between the time the read-only memory 54 is clocked and the time the output appears, there is a short delay provided by the clock generator 75 before the master register 20 is clocked to receive the ASCII line code. The clock generator 75 is of conventional design and adapts the sync time signals to the particular read-only memory 54 utilized.

The transmit cycle is then continued until the ASCII code is again entered into the master register 20 for the receive half of the complete cycle. As discussed above, in the transmit cycle of the ASCII mode, the keyboard code is converted to the ASCII line code while, in the receive cycle, the ASCII line code is converted to a BCD print code. As the "1" outputs of the master register flip-flops are permanently connected to the address positions of the read-only memory 54, it is conditioned for the change in code conversion by changing the signal at the second control address location A8 from transmit to receive. This is conveniently accomplished at sync time 5 as discussed above with reference to FIG. 6.

At sync time 7, the read-only memory 54 is clocked and the fourth series of NAND gates 126 are enabled again. The ASCII line code in the master register 20 is then converted to the BCD print code which appears at the B1 through B7 outputs of the read-only memory 54 and are gated through the fourth series of NAND gates 126 to the D inputs of the flip-flops of the master register which is then clocked as before to receive the print code.

The code conversion sequence for the BCD mode is somewhat more complex in that the six bit positions of the code must be derived from the remaining three outputs B8 through B10 of the read-only memory 54. As also shown in FIG. 9, these outputs are connected to the D inputs of the flip flops of the master register 20 through a fifth series of NAND gates 132 also connected in parallel with the other series of NAND gates. However, each of the three remaining outputs B8, B9 and B10 are connected to the inputs of two of the NAND gates 132 so that, for example, the output B8 is connected through two of the fifth series of NAND gates to the D inputs of flip-flops 1 and 4 of the master register 20. The fifth series of NAND gates 132 is enabled by a BCD signal **59*c* input and an "AD" signal applied to the respective inputs of an AND gate 132 with its output 135 connected to the second enabling inputs of the NAND gates 132. The AD signal is merely a control signal which is continuous so that the fifth series of NAND gates 132 remains enabled throughout the insertion sequence which follows. The AD signal is therefore generated at sync time 3** by suitable and conventional circuitry.

The time sequence for the BCD conversion is diagrammatically illustrated in FIG. 10 with reference to FIG. 9. Assume that the keyboard code has been inserted into the master register 20 as described above. This is the first address applied to the address positions A2 through A7 of the read-only memory 54. At sync time 2, the read-only memory 54 is clocked and three bits of the BCD code appear at outputs B8 through B10 after the short propagation delay indicated by P*d* in FIG. 10. The outputs of the read-only memory 54 are not gated into the flip-flops of the master register 20 at this time, however.

At sync time 3, the AD signal is generated, as discussed above, to enable the fifth series of NAND gates 132. The sync time 3 signal ST3 is also applied to one input of an AND gate 136 enabled by the BCD signal **59*c* to change the level of the first control address position A1 of the read-only memory 54. As previously pointed out, this results in a new specified set of coded outputs for the same inputs at address positions A2 through A7 of the read-only memory 54** to generate the fourth, fifth and sixth bits of the BCD line code.

Referring again to FIG. 9, at sync time 4 the read-only memory 54 is clocked again which would change the outputs B8 through B10 after the propagation delay Pd. However, before the outputs B8 through B10 can be changed, the sync time 5 signal ST5 is generated together with a master register clock pulse 137. The master register clock pulses 137 usually flow through normally open AND gates 138, 140 to flip-flops 1 through 3 and 4 through 8, respectively. However, the sync time 5 signal ST5 passes through an AND gate 142 enabled by the BCD signal 59c to generate a column signal 143 which disables the AND gate 140 supplying clock pulses to flip-flops 4 through 8, the first inhibiting function being designated as the column 1 signal "COL No. 1." The column signal 143 has to pass through a time delay network 144 to reach the AND gate 138 controlling the clock pulse 137 to flip-flops 1 through 3 so that they are not disabled. The clock pulse 137 then arrives only at flip-flops 1 through 3 which have their D inputs gated to the B8 through B10 outputs of the read-only memory 54. The first output of the read-only memory 54 is then entered into flip-flops 1 through 3 before the output of the read-only memory is changed, as illustrated in FIG. 10.

After the outputs B8 through B10 are changed in response to the second clocking with a new control address, the column signal 143 is no longer present at the AND gate 140 controlling the clock pulses 137 to flip-flops 4 through 8, but has reached the other AND gate 138, the second inhibiting function being designated as the column 2 signal (COL No. 2). The clock pulse 137 then clocks flip-flops 4 through 8 to enter the changed output of the read-only memory 54 into flip-flops 4 through 6, flip-flops 7 and 8 not being needed for the BCD line code.

Thus, the six bit BCD line code is generated from only three outputs B8 through B10 of the read-only memory 54 by using one control address to generate a first output, changing the control address and clocking the read-only memory again, but gating its first output into the first three flip-flops of the master register 20 before the output can be changed and thereafter gating the changed output into the next three flip-flops of the master register. While the particular illustrated method of obtaining a six bit code from a three bit output was made necessary because a read-only memory 54 of sufficient capacity was not available, it will be appreciated that the technique can be used in other applications. Additionally, the gating scheme illustrated can be modified to fit the characteristics of particular read-only memories.

Referring again to FIG. 1 discussed above, when the data terminal system of the present invention is used to receive data from the line 34, the control section 22 first determines whether the terminal is in the process of printing a character or performing a function. If it is not, the data being held in the recirculating buffer memory 42 is read into the master register 20 at a high speed. The operation of the system in the receive mode is illustrated in FIG. 2. The data is entered into the master register 20 and the sync time generator 44 (FIG. 6) is activated. However, the first six sync times are inhibited from operating in their usual manner by conventional circuitry so that the first sync time signal which is effective occurs at sync time 7. In the Correspondence mode, the Correspondence line code is converted to the Correspondence print code at sync time 8, in the Correspondence print code conversion step 45d as discussed above. The code conversions for the ASCII and BCD codes are also the same.

Referring now to FIGS. 2 and 7, at sync time 10, if a character code has been received, in the print enable step **45*e* (FIGS. 3, 4 and 5), the print mechanism 40 (FIG. 1) is enabled to print the character. The "1" output of each of the master register flip-flops 2 through 7 is connected through an amplifier 146 to the coils of solenoids 148 which actuate the rotate and tilt latches of the print mechanism 40 of the typewriter as discussed above. A print enable signal 149, generated during the print enable step 45*e*, actuates a print power section 150 which then applies to the solenoids 148. Which of the solenoids 148** are activated, depends on the state of its associated flip-flop.

As also shown in FIGS. 2 and 7, when a function code is received, the "1" outputs of flip-flops 2 through 7 are gated through a function decode matrix 152 at sync time 10 in a function decode step 153 and the output of the matrix is fed back to the D input of the flip-flop of the master register 20. Then "1" outputs of the flip-flops are connected through the amplifiers 146 to function solenoids 154 which initiate the state of the various functions such as carriage return, line index, tabulate, space, back space, bell and shift. A function enable signal 155 from a function enable section 156 then activates a function power section 158 to apply power to the particular solenoid 154 for a particular function. As only one function can be performed at a time, only one of the function solenoids 154 will be activated. The shift solenoid 154 is selectively operated by an upper-lower case comparison section 157 which uses the wait-for-shift signal (WFS) discussed above with reference to FIG. 6, as one of its control inputs.

Figure 11:
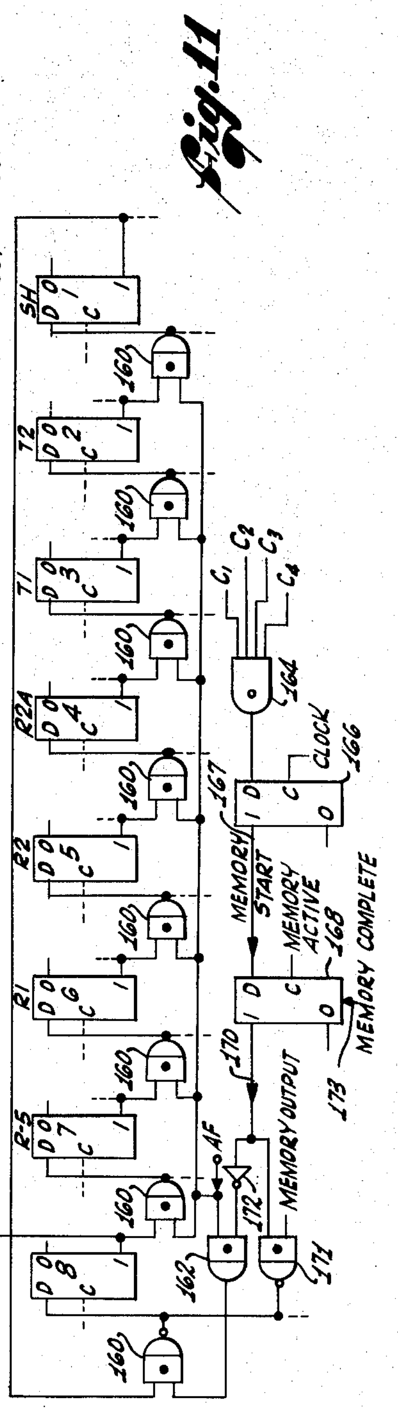
FIG. 11 is a logic function diagram of the master register and its associated logic gates for serially reading data out of the master register for transmission on the line or for serially reading data into the master register from the buffer memory of the system.

The serial read in and readout through the master register 20 is illustrated in FIG. 11. A sixth series of NAND gates 160 is provided with their outputs connected to the D inputs of the flip-flops in parallel with the other series of gates 110, 114, 120, 126, 132. A first input to each NAND gate 160 is connected to the "1" output of the next numbered flip-flop with the first input to the last NAND gate connected to the input of flip-flop 8 being connected to the "1" output of flip-flop 1 to form a recirculating path. The NAND gates 160 connected to flip-flops 1 through 7 are all enabled by a control signal AF which is generated at sync time 6 for the serial readout of the data in the master register 20. The control signal AF is also generated independently of sync time 6 when data is to be read in from the buffer memory 42, as discussed below. The signal AF enabling the NAND gate 160 connected to the flip-flop 8 passes through an additional normally-open AND gate 162 which,therefore, does not normally affect the serial connection of the flip-flops. The flip-flops are then clocked in a conventional manner a total of eight times to recirculate the data through the register 20. The data is outputed from the master register 20 to the input-output section 36 at the "1" output of the flip-flop 8 which is normally conventionally biased to a "1" level to serve as a start bit.

Still referring to FIG. 11, when data is to be read into the master register 20 from the memory 42, an indeterminate number of control signals C1, C2, C3, and C4 are combined, for example, as inputs to an AND gate 164 and, when all the signals are present, the output of the AND gate indicates that the master register 20 is available to receive data. The output of AND gate 164 may conventionally be fed to the D input of a flip-flop 166 which, when clocked, generates a memory start signal 167 which is applied to the D input of another flip-flop 168. The second flip-flop 168 is conventionally not clocked until the beginning of a particular character appears at the output of the recirculating buffer memory 42 using a method well-known in the art. The memory start signal 167 may also be conveniently used to generate the control signal AF to connect the flip-flops 1 through 8 of the master register 20 in a series. When the beginning of the desired character appears at the output of the memory 42, a memory active signal 169 then clocks the second flip-flop 168 to generate a read in signal 170 which enables a NAND 171 gate to accept the output from the memory and read it serially into the input to flip-flop of the master register. As recirculation in the master register 20 is not desired for memory read in, the read in signal 170 also disables the intermediate AND gate 162 by means of an inverter 172. After 8 bits are read into the master register 20, a conventionally derived memory complete signal 173 resets the second flip-flop 168 which removes the read in signal 170 and disables the memory output NAND gate 171. The code conversions and printing of a character, or performance of a function, then proceed as described above.

In the ASCII code, a number of special control signals are also used in addition to the characters and functions normally found on a typewriter. The coding scheme for these additional signals are generated within the data terminal system of the present invention by preconditioning two of the master register flip-flops prior to pressing a particular character key 24.

As observed in FIG. 7, the input to flip-flop 4 is preconditioned by disabling the intermediate NAND gate 112 between the R2A switch and the first input 109 to its NAND gate 110 and the first input to flip-flop 5 is preconditioned by a signal 178 derived from the output of a NAND gate 174 with its two inputs connected to the sync time 1 signal ST1 and to a special attention (ATN) signal 180 which is applied through an inverter 182 to the disabling input of the intermediate NAND gate 112 connected to switch R2A. The attention signal 180 is derived by pressing the margin release key of the typewriter which does not cause any moving function.

Thus, any of the special control signals in the ASCII code can be generated merely by pressing the margin release key of the typewriter while simultaneously pressing a particular character key 24. Additionally, selected control characters which cannot be printed or performed can also be received by the data terminal system through the operation of the function decode matrix 152 illustrated in FIG. 7. While these signals cannot be printed or performed by the machine, they can be supplied to auxiliary equipment.

In summary, the data terminal system of the present invention is highly versatile and efficient and can communicate with other data terminals using the Correspondence, ASCII or BCD line codes merely by setting a mode selector 56 switch position and perhaps changing the type head. The system incorporates a unique time sequencing code conversion system which goes through a complete transmit-receive cycle regardless of the desired operation of the terminal. To eliminate the need for complex logic circuits, all code conversions are made through parallel logic gates 70, 72 and a read-only memory 54 is utilized to simplify the code conversions. Additionally, a six bit BCD line code is derived from only three outputs **76*b* of the read-only memory 54 by clocking it twice and removing the first output before the second output appears. Furthermore, only one master register 20 is utilized for all initial data inputs, all intermediate code conversions and finally, to set the electromechanical actuators 38 of FIG. 1** which operate the typewriter, thereby reducing significantly the complexity of the data processing electronic apparatus of the system.

While a particular, presently preferred embodiment has been described in detail, it should be understood that many variations and modifications of the basic logic arrangements can be made. Therefore, the present invention is not to be limited except by the following claims.

We claim:

1. A data terminal system, comprising:

data input means for generating coded signals in accordance with a predetermined code in response to operation of said data input means;

first code converting means for converting said coded signals to a predetermined communications line code;

transmitting means for transmitting said line code to a communications line;

second code converting means for converting said line code to a predetermined print code following the transmitting of said line code to the communications line;

data output means for printing data in response to said print code;

a control means for controlling the operation of said first code converting means, said transmitting means and said second code converting means, said control means having a means for generating a single timing sequence defining a plurality of sequential sync times; and a mode selecting means for selecting one of a plurality of communications line codes, certain of said sync times being associated only with a particular line code, said mode selecting means selectively enabling particular combinations of sequential sync times for complete code conversions for particular line codes.

2. A data terminal system as defined in claim 1, further including:

master register means for storing data, said master register means having a plurality of data storage elements each with an input and an output;

at least one code converting logic network having inputs and outputs, said logic network having its inputs connected in parallel with the outputs of said storage elements of said register means and its outputs connected in parallel with the inputs of said storage elements at a particular sync time to convert the code in said register means at the particular sync time.

3. A data terminal system as defined in claim 2, wherein said data input means includes:

a keyboard section of a type head electric typewriter which produces the actuation of a set of mechanical elements in accordance with a predetermined character code in response to the depression of the character keys of said keyboard section; and a set of switches operatively connected to said set of mechanical elements said switches generating said coded signals in response to actuation of said set of mechanical elements.

4. A data terminal system as defined in claim 3, wherein said data output means includes:

a plurality of solenoids connected to the print mechanism of a type head electric typewriter, said solenoids being selectively activated in accordance with said print code to operate said print mechanism to print particular characters.

5. A data terminal system as defined in claim 1, further including:

master register means for storing data, said master register means having a plurality of data storage elements each with an input and an output; and a plurality of code converting logic networks each having its inputs connected in parallel to the outputs of said storage elements of said register means, the outputs of each of said logic networks being connected in parallel to the inputs of said storage elements at particular sequential sync times in accordance with the selective enabling of said mode selecting means for a particular line code.

6. A data terminal system as defined in claim 5, including:

a keyboard section of a type head electric typewriter;

function encoding network means connected to the function keys of the typewriter for generating a predetermined function code in response to depression of a function key, said function code being stored in said master register means at a particular sync time in said timing sequence; and reset means connected to said function encoding network means and said control means for resetting said timing sequence following the transmitting of said line code to the communications line.

7. A data terminal system as defined in claim 6, wherein:

said data input means includes;

a keyboard section of a type head electric typewriter which produces the actuation of a set of mechanical elements in accordance with a predetermined character code in response to the depression of the character keys of said keyboard section; and a set of switches operatively connected to said set of mechanical elements, said switches generating said coded signals in response to actuation of said set of mechanical elements; and said data output means includes;

a plurality of solenoids connected to the print mechanism of a type head electric typewriter, said solenoids being selectively activated in accordance with said print code to operate said print mechanism to print particular characters.

8. A data terminal system as defined in claim 5, including:

transmission line input-output means for interfacing said terminal system with the line, said line input-output means having buffer memory means for storage of data received from the line; and wherein said control means includes means for reading data into said master register means, when said register means is inactive, and thereafter enabling only those sync times of said timing sequence which convert said line code to said print code.

9. A data terminal system as defined in claim 8, including:

a plurality of function electromechanical actuators connected to the outputs of said storage elements of said master register; and function decoding network means having input connected to the outputs of said storage elements of said master register for converting a function code to a single function signal at its outputs for connection to the inputs of said storage elements to condition only one of said storage elements to actuate one of said function electromechanical actuators at a particular sync time of said timing sequence.

10. A data terminal system as defined in claim 9, including:

a keyboard section of a type head electric typewriter;

function encoding network means connected to the function keys of the typewriter for generating a predetermined function code in response to depression of a function key, said function code being stored in said master register means at a particular sync time in said timing sequence; and reset means connected to said function encoding network means, and said control means for resetting said timing sequence following the transmitting of said line code to the communications line.

11. A data terminal system as defined in claim 10, wherein:

said data input means includes;

a keyboard section of a type head electric typewriter which produces the actuation of a set of mechanical elements in accordance with a predetermined character code in response to the depression of the character keys of said keyboard section; and a set of switches operatively connected to said set of mechanical elements, said switches generating said coded signals in response to actuation of said set of mechanical elements; and said data output means includes;

a plurality of solenoids connected to the print mechanism of a type head electric typewriter, said solenoids being selectively activated in accordance with said print code to operate said print mechanism to print particular characters.

12. A data terminal system as defined in claim 11, wherein:

said function electromechanical actuators are solenoids having their armatures connected substantially in parallel with the associated function keys of said typewriter.

13. A data terminal system as defined in claim 5, wherein:

said data input means for generating coded signals includes the keyboard section of a type head electric typewriter in which the depression of each character key causes the actuation of a set of mechanical elements in accordance with a predetermined character code and a set of switches operatively connected to said set of mechanical elements, said switches being operated in response to actuation of said set of mechanical elements in said predetermined character code;

said data output means includes a plurality of solenoids connected to the print mechanism of a type head electric typewriter, said solenoids being selectively activated said print code to print a particular character;

a master register having a plurality of logical memory elements, said memory elements being of delay-memory type in which the outputs of said memory elements corresponds to the state of the input to said memory elements following the clocking of said memory element;

a plurality of code converting logic networks each having an input and an output; and a control means for first connecting each of said switches to a respective input to a logical memory element of said register means, thereafter connecting said outputs of said memory elements in parallel with the inputs of one of said plurality of code converting logic networks and concurrently connecting the outputs of said one of said networks in parallel with said inputs to said memory elements of said register means to convert said electric signals of said switches to a preselected line code, said control means thereafter initiating the transmitting of said line code over a transmission line, said control means thereafter connecting the outputs of said memory elements of said register means in parallel with said inputs to another of said plurality of logic networks and concurrently connecting said outputs of said another logic network in parallel with said inputs of said memory elements to convert said line code to said print code, said control means thereafter connecting said outputs of said memory elements of said register means to a plurality of buffering amplifiers, said amplifiers being connected to respective first terminals of said solenoids, said control means thereafter supplying power to respective second terminals of said solenoids to print a character.

14. A method of making code conversions in a data terminal system, comprising:

entering data from a data input means into a master register;

converting said data to a suitable communications line code and re-entering said line code into said master register;

transmitting said line code to a transmission line;

further converting said line code to a print code and re-entering said print code into said master register;

activating a data output means from said print code in said master register; and controlling each step by means of a single timing sequence.

15. A method of making code conversions in a data terminal system, comprising:

entering data from a data input means into a master register;

converting said data to a suitable communications line code and re-entering said line code into said master register;

transmitting said line code to a transmission line;

further converting said line code to a print code and re-entering said print code into said master register;

activating a data output means from said print code in said master register;

making code conversions by parallel gating of the master register flip-flops through code converting logic networks and said transmitting of said line code is made by serial gating of said flip-flops; and controlling each step by means of a single timing sequence.

16. A method of making code conversions in a data terminal system capable of communicating in a number of different communications line codes, said method comprising:

entering data from a data input means into a master register;

converting said data to a suitable communications line code and re-entering said line code into said master register;

transmitting said line code to a transmission line;

further converting said line code to a print code and re-entering said print code into said master register;

activating a data output means from said print code in said master register;

controlling each step by means of a single timing sequence which includes a plurality of sequential sync times certain of which are associated only with a particular line code; and selecting predetermined combinations of sequential sync times to be enabled for complete code conversions for a particular line code.

17. The method of claim 16, including:

making code conversions by parallel gating of the master register flip-flops through code converting logic networks and said transmitting of said line code is made by serial gating of said flip-flops.

* * * * *

PO-1050
(5/69)

UNITED STATES PATENT OFFICE
CERTIFICATE OF CORRECTION

Patent No. 3,701,856 Dated October 31, 1972

Inventor(s) CARL G. STUCK, ARTHUR L. WILKES

It is certified that error appears in the above-identified patent and that said Letters Patent are hereby corrected as shown below:

Column 3, line 19, delete "immediate" and insert therefor --intermediate--.

Column 4, line 43, after "code", delete "of" and insert therefor --to--.

Column 11, line 38, delete "56a" and insert therefor --56c--.

Column 12, line 44, after "signal" delete "59c or 59b" and insert therefor --59a or 59c--.

Column 14, line 66, after "54" delete "is" and insert therefor --are--.

Column 18, line 58, after "flip-flop" insert --8--.

Column 22, line 31, delete "5" and insert therefor --1--; line 51, delete "outputs" and insert therefor --output--.

Signed and sealed this 3rd day of April 1973.

(SEAL)
Attest:

EDWARD M.FLETCHER,JR.
Attesting Officer

ROBERT GOTTSCHALK
Commissioner of Patents